United States Patent
Sanchez et al.

(10) Patent No.: US 10,852,765 B2
(45) Date of Patent: Dec. 1, 2020

(54) ELECTRONICALLY CONTROLLED VARIABLE HINGE TORQUE

(71) Applicant: Dell Products L.P., Round Rock, TX (US)

(72) Inventors: Anthony J. Sanchez, Pflugerville, TX (US); Jason Scott Morrison, Chadron, NE (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/250,841

(22) Filed: Jan. 17, 2019

(65) Prior Publication Data

US 2020/0233459 A1 Jul. 23, 2020

(51) Int. Cl.
*G06F 1/16* (2006.01)
*E05D 11/08* (2006.01)
*E05D 3/12* (2006.01)
*E05F 1/12* (2006.01)

(52) U.S. Cl.
CPC ............ *G06F 1/1618* (2013.01); *E05D 3/12* (2013.01); *E05D 11/082* (2013.01); *E05F 1/1223* (2013.01); *G06F 1/1643* (2013.01); *G06F 1/1681* (2013.01); *E05D 2011/085* (2013.01)

(58) Field of Classification Search
CPC ....... G06F 1/1616; G06F 1/1681; E05D 11/87

USPC ....................................... 361/679.27; 16/320
See application file for complete search history.

(56) References Cited

U.S. PATENT DOCUMENTS

| 8,564,944 B2* | 10/2013 | Whitt, III | G06F 1/1618 |
| | | | 361/679.27 |
| 9,353,560 B2* | 5/2016 | Sprenger | E05D 11/082 |
| 9,411,365 B1 | 8/2016 | Tanner et al. | |
| 9,483,126 B2 | 11/2016 | Sprenger et al. | |
| 2007/0186382 A1 | 8/2007 | Huang | |
| 2009/0316348 A1* | 12/2009 | Tseng | G06F 1/1616 |
| | | | 361/679.28 |
| 2014/0146484 A1* | 5/2014 | Chen | G06F 1/1679 |
| | | | 361/728 |
| 2017/0068283 A1 | 3/2017 | Liang et al. | |
| 2018/0058120 A1* | 3/2018 | Hamel | E05D 11/082 |
| 2018/0074545 A1* | 3/2018 | McBroom | G06F 1/1677 |

* cited by examiner

*Primary Examiner* — Anthony Q Edwards
(74) *Attorney, Agent, or Firm* — Zagorin Cave LLP; Robert W. Holland

(57) ABSTRACT

A portable information handling system rotationally couples housing portions with a hinge having an adjustable friction device that adjusts a torque resisting rotation of the housing portions between alternate settings by sending an electronic pulse to an electropermanent magnet. For instance, activation of a magnetic field pulls a lever that compresses compression discs coupled to a hinge axle to increase torque, such as to hold the housing portions in position. An electronic pulse deactivates the magnetic field when an end user desires to rotate the housing portions, such as may be indicated by an end user touch at a housing portion.

18 Claims, 5 Drawing Sheets

ELECTRONICALLY CONTROLLED VARIABLE HINGE TORQUE

BACKGROUND OF THE INVENTION

Field of the Invention

The present invention relates in general to the field of portable information handling systems, and more particularly to a portable information handling system electronically controlled variable hinge torque.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems are built in portable housings to support mobile operations free from external cables. For example, portable information handling systems typically integrate processing components, a battery and a touchscreen display that presents information as visual images and accepts touches as inputs. Tablet portable information handling systems generally dispose processing components and the battery in a planar housing covered by the touchscreen display. Convertible information handling systems typically have separate planar housing portions rotationally coupled by a hinge to rotate between a closed position and various open positions that accept inputs, such as a clamshell and tablet position. Conventional convertible information handling systems integrate the touchscreen display in one planar housing portion and a keyboard in the other planar housing portion so that an end user can type inputs into the information handling system. Some convertible information handling systems rotate housing portions 360 degrees relative to each other to a tablet position that exposes the touchscreen display on one side and hides the keyboard underneath on the other side. Generally, one goal of a portable information handling system is to keep the size and weight of the system to a minimum. The length and width of a convertible information handling system is typically driven by the size of the display integrated in one of the housing portions so that height of the convertible information handling system usually offers the most flexibility for reducing system size and weight.

One difficulty that arises with low Z-height convertible information handling systems is that lighter weight housing materials and small hinges tend to result in torsional forces that twist housing portions in response to forces applied to rotate the housings. Minimizing torsional forces to remain within stress-related constraints typically involves careful balancing of hinge and housing strength with friction generated rotational torque at the hinge to maintain hinge position. Often with light weight thin systems, rotating housing portions from a closed to an open position is a two-handed operation. For instance, low Z-height thin housing portions are difficult to grasp and pull apart. Further, low-weight systems will lift off a supporting surface in response to an upward force at a housing portion unless hinge torque is minimal; however, too low of a hinge torque will fail to hold the housing portions in an position when rotated open for use, such as in a clamshell mode.

One option for managing housing portion rotational position is to vary the torque applied to a hinge so that less torque is applied during initial movement from the closed towards an open position. Typically variable torque hinges have discrete mechanical increases in torque at defined rotational angles that an end user can perceive. Although reduced torque on opening allows easier opening of a housing for an end user, it also holds the housing in a less secure manner during storage so that the lid may more easily fall open, resulting in damage to the display and keyboard. As the housing rotates to an open position desired by an end user, increased torque typically kicks in so that an end user has to resort to two-handed operation to further open the housing. In any event, within a rotational orientation range of normal use a relatively high torque is typically applied to hold the housing portions in position. Rotational motion in these high torque orientations generates torsional forces that strain housing and hinge mechanical constraints.

SUMMARY OF THE INVENTION

Therefore, a need has arisen for a system and method which adapts hinge torque to rotational conditions of a portable information handling system.

In accordance with the present invention, a system and method are provided which substantially reduce the disadvantages and problems associated with previous methods and systems for applying torque at a portable information handling system hinge. A friction device engaged with a hinge axle provides a first or second torque based upon a selection made at a friction adjuster so that torque applied at a portable housing is reduced when an end user desires to adjust rotational orientation and increased when the end user has set a desired rotational orientation.

More specifically, a portable information handling system disposes processing components and a display in rotationally coupled housing portions. One or more hinges couple between the housing portions to support rotation of the housing portions relative to each other between closed and open positions. A friction device interfacing between an axle and a bracket of the hinge generates friction that resists rotation of the axle relative to the bracket to provide torque that holds the housing portions in a rotational orientation, such as a closed or clamshell rotational orientation. For example, an electropermanent magnet has a magnetic field toggled between on and off settings to selectively increase and decrease torque at the hinge based upon end user interactions with the information handling system. For instance, an end user touch at a housing portion is analyzed at an embedded controller to determine if the end user desires to rotate the housing portions and, if so, an electronic signal pulse sent to the electropermanent magnet shuts off the magnetic field to release some compression at compression discs of the friction device, thereby providing easier rotation of the housing portions. After the end user achieves a desired rotational orientation, such as may be indicated by release of the housing portions, a subsequent electronic signal pulse to the electropermanent magnet reinstates the magnetic field to compress the compression discs and hold the housing portions in position. In one example embodiment, the electropermanent magnet operates through a double lever that enhances force applied against the compression discs.

The present invention provides a number of important technical advantages. One example of an important technical advantage is that a portable information handling system applies variable torque based upon rotational conditions at a housing. For example, decreasing torque during rotational movement of housing portions decreases torsional forces so that lighter weight materials may be used, thus reducing system height and weight. From a closed position, reducing torque at a touch by an end user to the housing allows one handed rotation of a housing portion without lifting the other housing portion from a support surface. Increasing torque at a desired rotational position holds the housings in position for end user interactions, such as in a clamshell mode. Applying full torque at a hinge when closed maintains the closed position for transportation of the information handling system with the display and keyboard protected from damage. Leveraging an electropermanent magnet to establish high versus low torque provides a minimal energy use for managing hinge torque.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system hinge varies torque based upon context with an electronic signal pulse. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
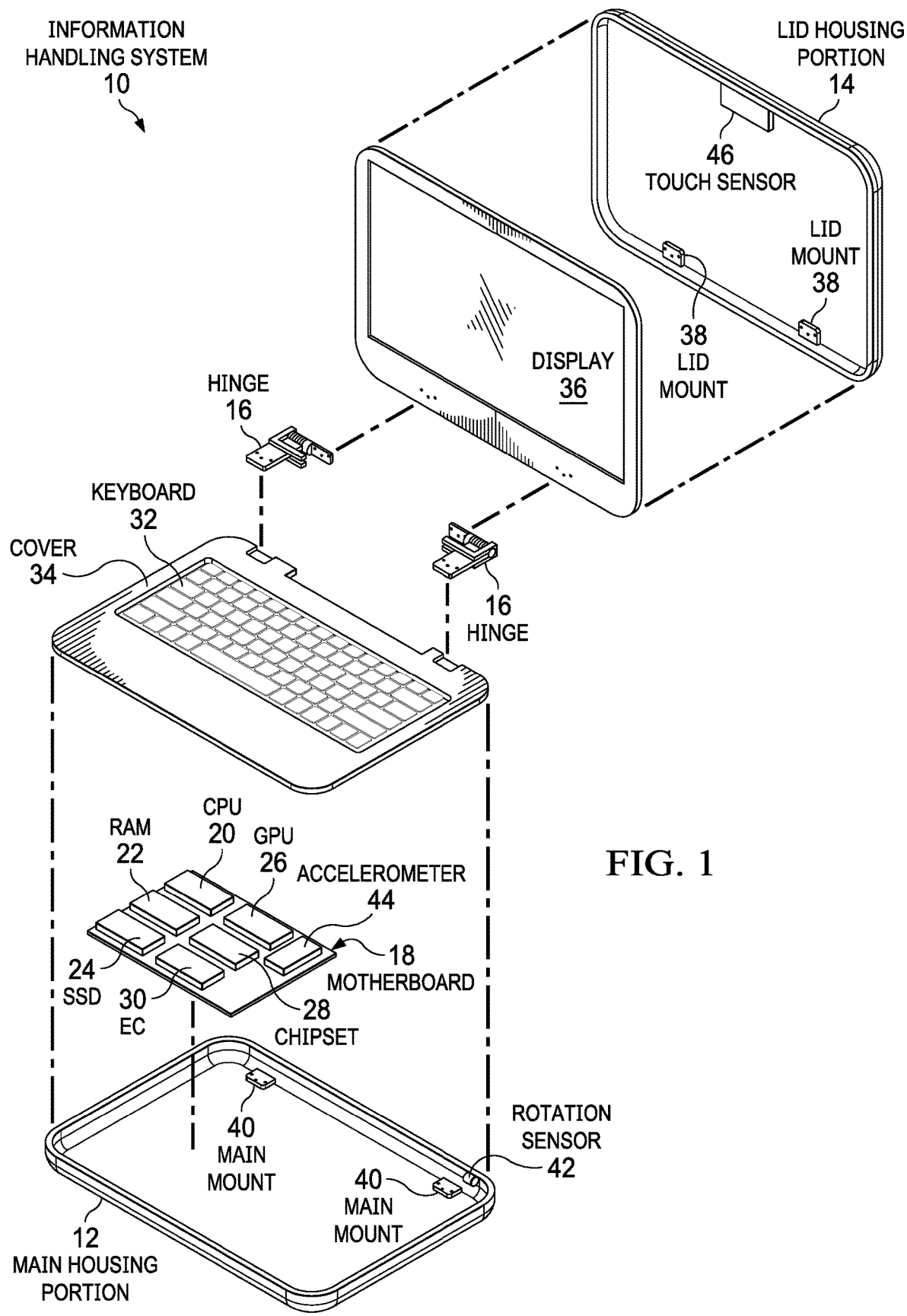
FIG. 1 depicts an exploded view of a portable information handling system having a variable torque hinge adjusted by an electronic signal pulse.

Referring now to FIG. 1, an exploded view depicts a portable information handling system 10 having a variable torque hinge 16 adjusted by an electronic signal pulse. In the example embodiment, portable information handling system 10 has a main housing portion 12 rotationally-coupled to a lid housing portion 14 by a set of hinges 16 having a single axle each. Main housing portion 12 contains components that cooperate to process information that communicate through a motherboard 18. For instance, a central processing unit (CPU) 20 executes instructions stored in random access memory (RAM) 22 to process information, such as an operating system and application instructions retrieved from persistent memory of a solid state drive (SSD) 24. A graphics processor unit (GPU) 26 interfaces with CPU 20 and RAM 22 through motherboard 18 to further process information for presentation as visual images, such as by defining visual images with pixel values. A chipset 28 supports CPU 20 operations, such as by coordinating clock speed, peripheral communications and memory accesses. An embedded controller 30 manages power and input/output (I/O) device interactions, such as inputs made by a keyboard 32. The example embodiment depicts some examples of components that cooperate to process information and alternative embodiments may have various other components disposed in alternative arrangements, such as for power supply, peripheral communication and wireless communication.

In the example embodiment, cover 34 integrates keyboard 32 and couples to main housing portion 12 to contain and protect the components. A display 36 integrates in lid housing portion 14 and interfaces with GPU 26 to present processed information as visual images, such as are defined by pixel values. Lid housing portion 14 couples to hinges 16 at lid mounts 38, such as with screws that pass through brackets of hinges 16 and into lid mounts 38. Similarly, main housing portion 12 couples to hinges 16 at main mounts 40, such as with screws that pass through brackets of hinges 16 and into main mounts 40. In the example embodiment, hinges 16 have a single axle about which lid housing portion 14 rotates relative to main housing portion 12. Hinge 16 manages rotation of lid housing portion 14 relative to main housing portion 12 by generating a variable torque to resist rotation through a varied friction as described in greater depth below. In alternative embodiments, hinge 16 may have dual axles, such as support 360 degrees of motion of lid housing portion 14 relative to main housing portion 12. In such embodiments, torque may translate across dual axles through a geared relationship for synchronized motion or through other coordination devices, such as sequential mechanisms.

In the example embodiment, logic executing on embedded controller 30 selects a torque at hinges 16 by adjusting friction of a friction device at hinge 16 based upon sensed context. For instance, each hinge 16 has two torque levels: a first torque level set if a sensed context indicates rotational movement about hinges 16 related to an end user input; and a second torque level set if a sensed context indicates a fixed rotational orientation is desired by an end user. The sensed context may result from conditions sensed at a number of sensors, including a rotation sensor 42, an accelerometer 44 and a touch sensor 46. In alternative embodiments, sensed context may be derived from other types of sensors, such as camera, microphone, Doppler, and infrared devices. A context indicates that an end user desires to rotate housing portions, as an example, if an end user grasps a location at a touch sensor 46 associated with rotational movement of housing portions. In one example embodiment, a press button may be incorporated at a housing portion that an end user presses to select a reduced torque when the end user desires to rotate housing portions. A press button may sit idle with less power consumption than a touch sensor, such as by connecting a power source to a GPIO of the embedded controller. Once a context indicates that an end user desires to rotate the housing portions, embedded controller 30 sends a signal pulse to hinges 16 to command a reduced torque so that the housing portions rotate with little force, such as approximately 2 kgf-cm. Although a touch sensor provides a direct indication of end user intent by monitoring a grasp location, other contextual information may be analyzed to determine end user intent, such as a camera image, accelerations, power state, etc . . . .

Once the context reported by the sensors to embedded controller 30 indicates that housing portion rotation is complete, embedded controller 30 sends an electronic pulse signal to hinges 16 to select an increased torque setting, such as by increasing friction generated by rotation of hinge 16. For instance, a high torque setting may resist rotation at up to 3 kgf-cm. As an example, context may indicate that an end user has selected a fixed rotational orientation by a steadying of rotational orientation for a predetermined amount of time, such as 3 seconds. Alternatively, a release of an end user grasp after rotation from a closed to an open position may indicate a rotational orientation selection. In contrast, a release of touch sensor 46 after rotation from an open to a closed position may indicate a selection of a closed position so that hinges 16 maintain a low torque setting for as long as rotational sensor 42 indicates a rotational orientation moving towards a closed position. In one embodiment, high accelerations detected by accelerometer 44 may result in a high torque setting even during rotational movement by an end user touch so that excessive hinge rotational forces are not experienced. Similarly, before shutting off power to touch sensor 46, embedded controller 30 may set a high torque at hinges 16 to keep the housing portions in a closed position during storage. Although the high torque setting will increase the difficulty of pulling the housing portions apart, the housing portions will remain securely closed for transport to protect keyboard 32 and display 36 from damage.

Figure 2:
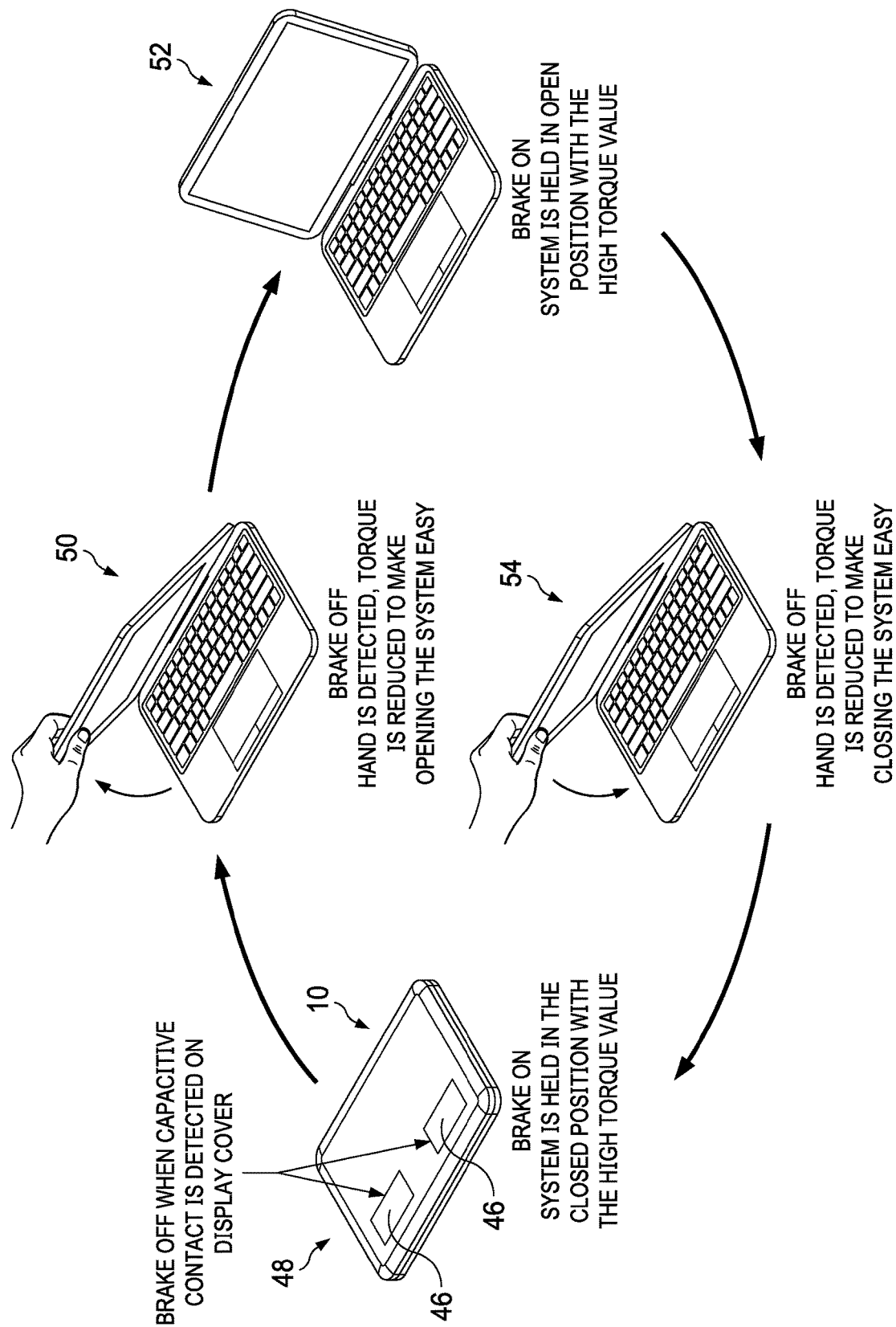
FIG. 2 depicts the portable information handling system having torque varied based upon touch context.

Referring now to FIG. 2, the portable information handling system 10 is depicted having torque varied based upon touch context. In an initial configuration 48 without any touches detected at capacitive touch sensors 46 located on an upper and outer surface of information handling system 10, a high torque is set to "brake" the housing portions, thus holding the housing portions in a closed position. As a touch is detected at touch sensors 46, a low torque is set to turn off the hinge "brake" at configuration 50 and thus reduce the torque needed to make rotational movement to an open position less difficult. With the reduced torque, torsional forces introduced at the housing portions is reduced so that fewer twisting forces are exerted against the structure and hinge. Further, with the low torque set, a single hand can rotate the housings without lifting the housing off of a desktop. Upon release of the touch at sensor 46 at configuration 52, the high torque is set again to hold the position in the selected rotational orientation, such as the clamshell position depicted by the example embodiment. Once an end user grasps information handling system 10 as shown in configuration 54, the low torque is set to allow a single-hand closing motion. As described above, a context indicating a power off of information handling system 10 may result in a low torque set until the closed position is achieved followed by a high torque set while in a power off state.

Figure 3:
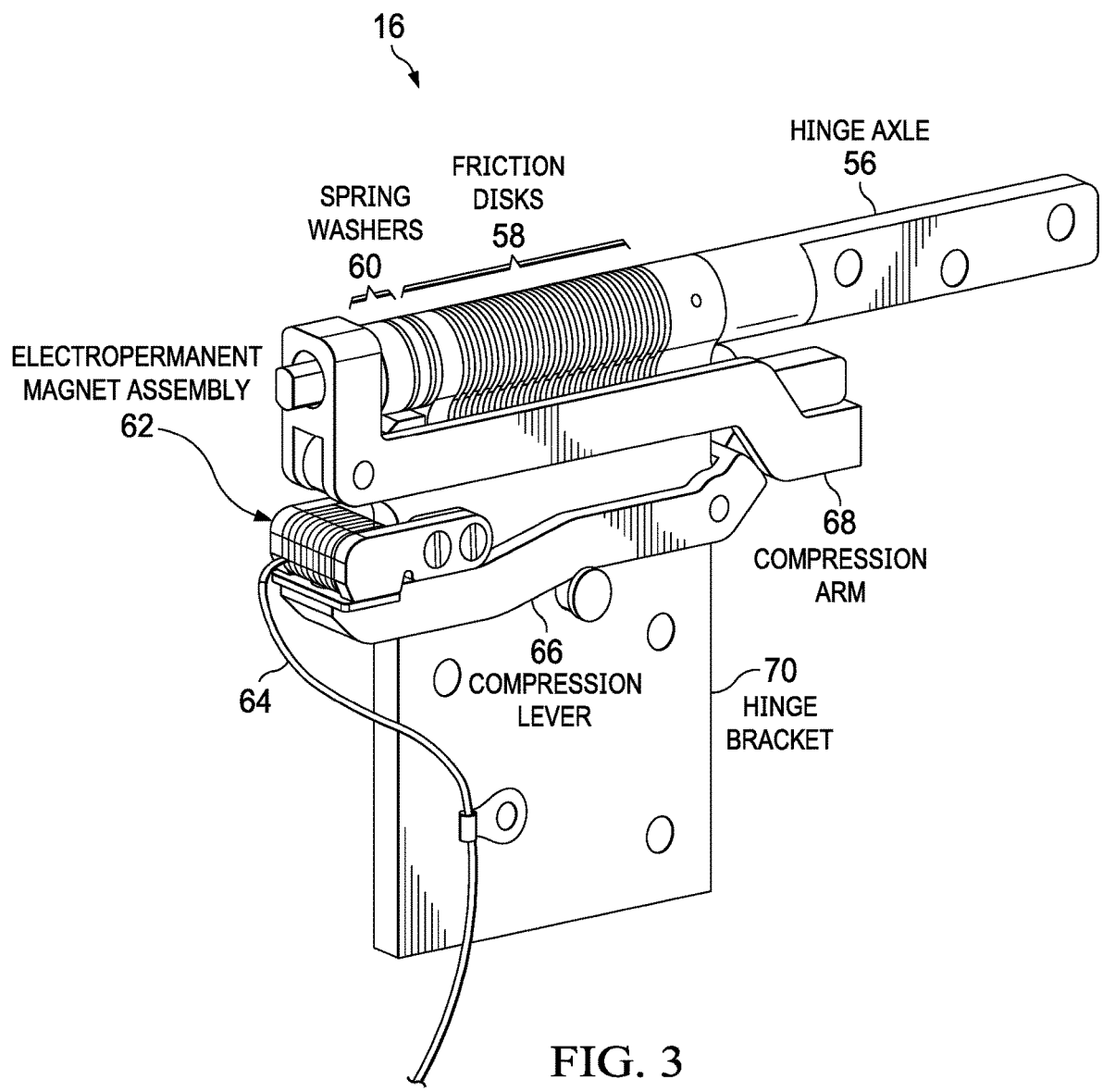
FIG. 3 depicts a side perspective view of a variable torque hinge adjusted by an electronic signal pulse.

Referring now to FIG. 3, a side perspective view depicts a variable torque hinge 16 adjusted by an electronic signal pulse. In the example embodiment, hinge 16 has a single axle 56 that attaches to a first housing portion and rotates relative to a hinge bracket 70 that attaches to a second housing portion. Axle 56 rotates within a friction device that generates torque through frictional resistance against rotation of axle 56. In the example embodiment, friction disk 58 is built from first and second sets of compression discs that are pressed against each other by a spring washer 60. Spring washer 60 is held in place by a compression arm 68, which presses spring washer 60 towards friction device 58. A compression lever 66 engages with compression arm 68 to set the amount of compression that is provided against spring washers 60. Compression lever 66 in the example embodiment has only two positions, which are selected by an electrical signal pulse 64 sent to an electropermanent magnet 62. When electropermanent magnet 62 has a magnetic field, the magnetic field pulls compression lever 66 upwards to translate compression to spring washer 60 through a double lever action provided through compression arm 68. When electropermanent magnet 62 has the magnetic field shut off or otherwise minimized, compression is reduced at spring washer 60 as force applied by compression lever 66 and compression arm 68 is reduced.

The example embodiment provides a variable torque hinge 16 with two torque settings, where each torque setting is associated with an electropermanent magnet magnetic field orientation. In summary, an electropermanent magnet has two magnets in proximity to each other and a coil. Current sent through the coil generates a magnet field that reverses the magnetic field of one of the two permanent magnets. When the two magnets align their magnetic fields, a strong magnetic field results external to the electropermanent magnet; while misaligned magnetic fields cancel each other to result in a weak or non-existent magnetic field external to the electropermanent magnet. Hinge 16 provides an electrical signal pulse through wire 64 that is sufficient to alter the permanent magnetic field external to electropermanent magnet 62 when a change to hinge torque is desired. Advantageously, power consumption to adjust magnetic field is temporary and minimal because continuous application of power is not needed to maintain the magnetic field in a desired orientation. Although the example embodiment uses an electropermanent magnet, an alternative embodiment may use alternative physical switching mechanisms, such as a solenoid. Further, additional variable torques may be provided by including additional electropermanent magnets to provide different amounts of compression at spring washer 60.

Figure 4:
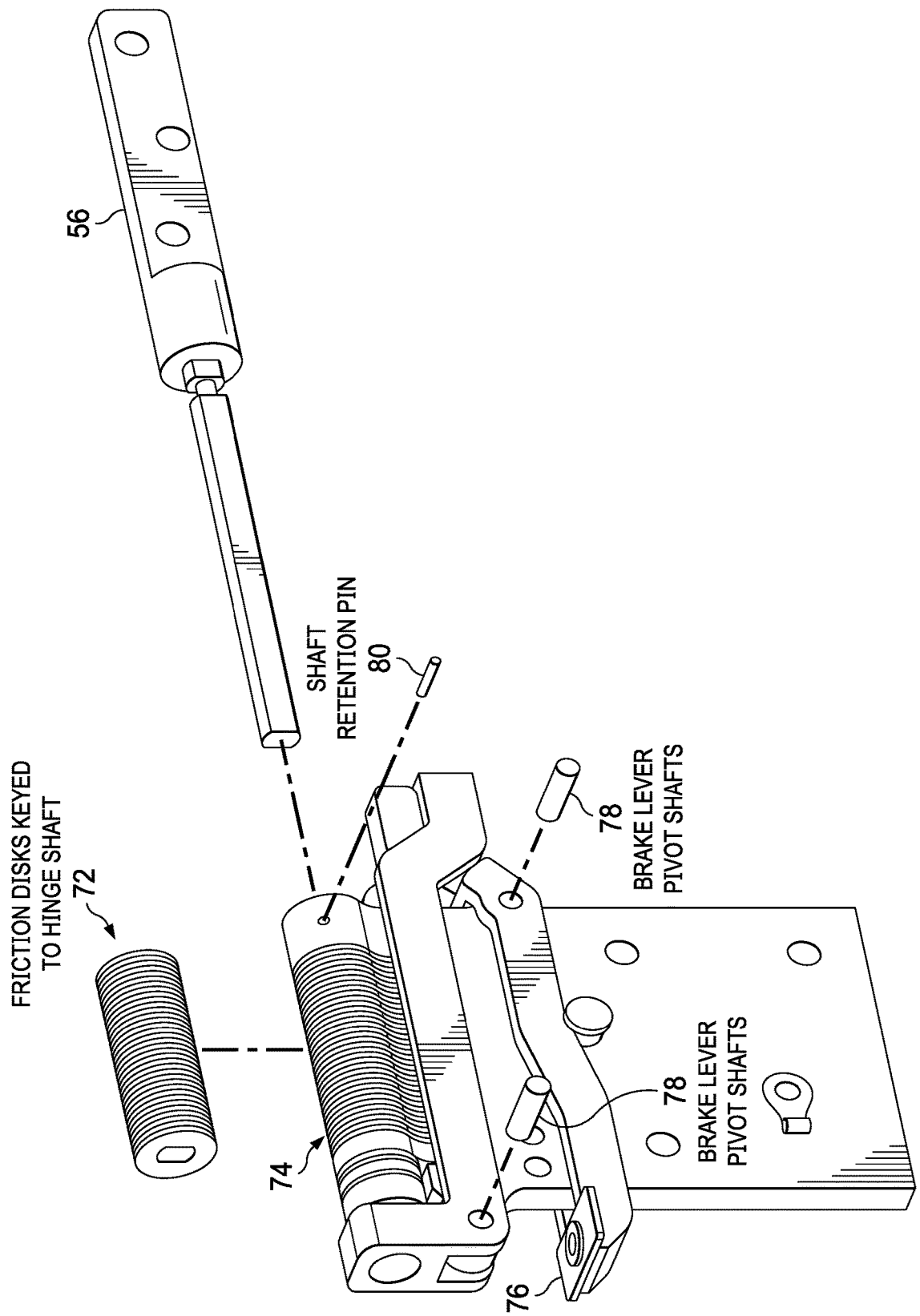
FIG. 4 depicts a perspective exploded view of the variable torque hinge friction device.

Referring now to FIG. 4, a perspective exploded view depicts the variable torque hinge friction device 72. In the example embodiment, friction is generated between a first set of compression discs 72 that rotate with axle 56 and a second set of compression discs 74 that remain stationary relative to bracket 70. Axle 56 is held in compression disc 76 by shaft retention pin 80. For instance, axle 56 has a shape that keys to a shape of the interior of the first set of friction discs 72 so that the first set of compression discs 72 turn with axle 56 with resistance provided by the second set of compression discs 74 pressed against the first set of compression discs 72. Pivot shafts 78 insert through each of compression arm 68 and compression lever 66 to define a pivot point of each lever structure. By pivoting compression lever 66 at an opposing end of electropermanent magnet 62, a mechanical advantage is provided by applying force against compression arm 68. Similarly, pivoting compression arm 68 proximate the compression location at spring washer 60 and distal the lever operation of compression lever 66, a mechanical advantage is provided in application of force against spring washer 60. In the example embodiment, a mechanical advantage of approximately 18:1 is provided to concentrate compression force at spring washer 60. A ferromagnetic material 76 or other high permeability plate couples to compression lever 66 to provide magnetic attraction.

Figure 5:
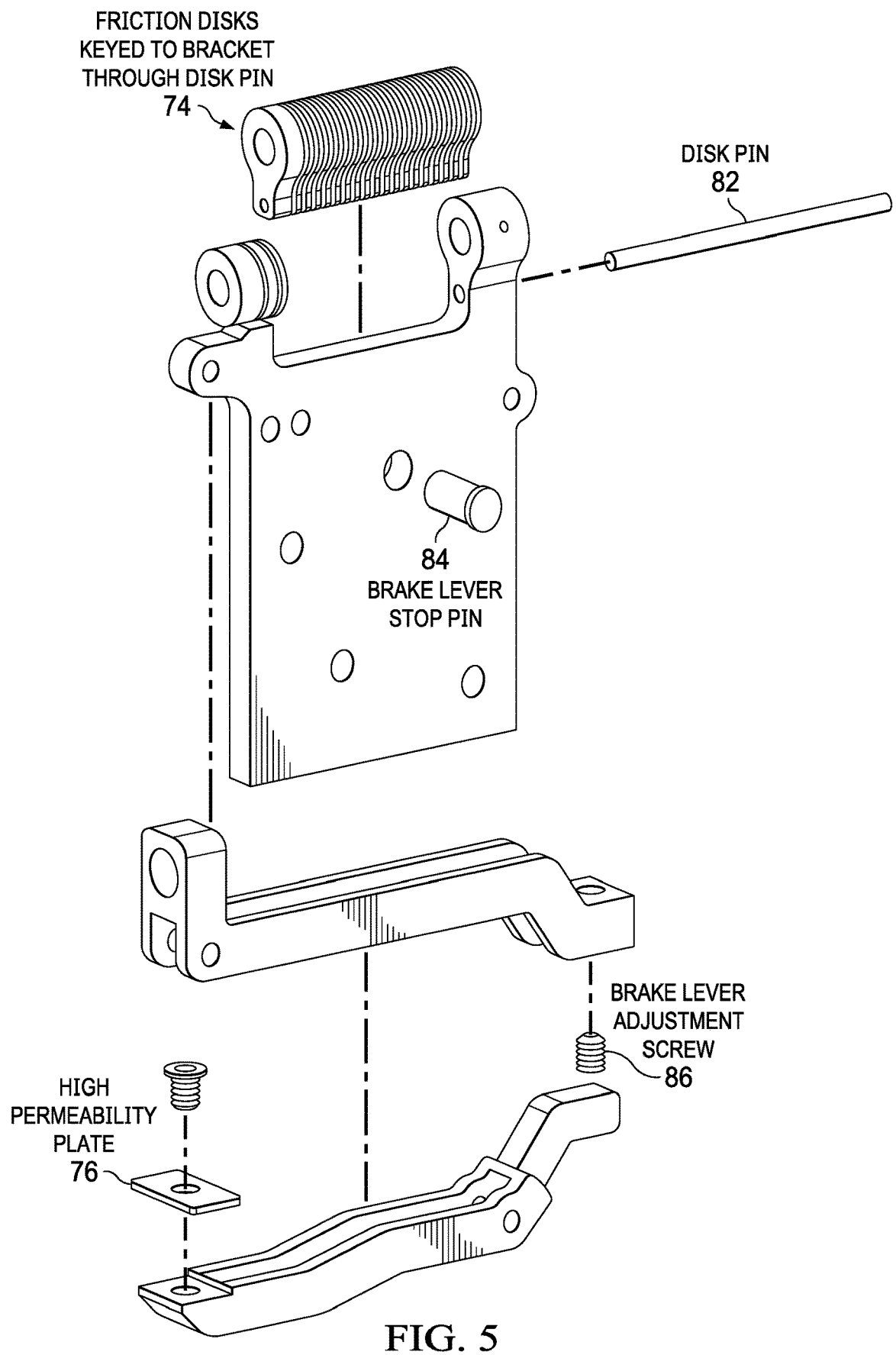
FIG. 5 depicts an exploded view of the variable torque hinge compression lever and compression arm.

Referring now to FIG. 5, an exploded view depicts the variable torque hinge 16, compression lever 68 and compression arm 68. The second set of compression discs 74 are held in a fixed position by a pin 82 that inserts through bracket 70 and an opening formed in a bottom narrow portion of compression discs 74. Both compression lever 68 and compression arm 66 have a central opening through which bracket 70 inserts. Compression arm 68 central opening fits around the narrow portion of compression discs 74 to help maintain their fixed relative position. A stop pin 84 defines a limit for downward motion of compression lever 66 and a set screw 86 adjusts the native position of compression arm 68 based upon the bottom position of compression lever 66, thus defining the compression provided with the electropermanent magnet field shut off.

In various embodiments, various amounts of torque may be desired based upon the size and weight of information handling system housing portions. Further, various amounts of compression and mechanical advantage may be desired when an electropermanent magnet field is turned on. In the example embodiment, a total compression movement applied at spring washer 60 of 0.009741 mm is provided with an 18:1 mechanical advantage by providing a magnetic force of 0.175439 kg with a movement at the electropermanent magnet of 0.175335 mm. Other embodiments may apply different magnetic forces for different amounts of compressive movement as desired to achieve a torque that provides housing rotation within set mechanical constraints.

Although the present invention has been described in detail, it should be understood that various changes, substitutions and alterations can be made hereto without departing from the spirit and scope of the invention as defined by the appended claims.

What is claimed is:

1. A portable information handling system comprising:
   first and second housing portions;
   processing components disposed in at least one of the first and second housing portions, the processing components cooperating to process information;
   a display disposed in at least one of the first and second housing portions, the display interfaced with the processing components and operable to present the information as visual images;
   a hinge rotationally coupling the first and second housing portions, the hinge having an axle interfaced with a friction device, the friction device resisting rotation of the axle with a first setting having a first friction and a second setting having a second friction;
   an electropermanent magnet interfaced with the friction device to select the first setting when magnetized and the second setting when demagnetized; and
   a controller interfaced with the electropermanent magnet, the controller selecting the first or second setting based upon one or more predetermined conditions;
   wherein the friction device comprises compression discs disposed on the axle, the hinge further comprising:
   a compression arm aligned to press against the compression discs; and
   a compression lever coupled at a first end with the compression arm and at a second end with the electropermanent magnet, the electropermanent magnet magnetizing to engage the compression lever at the compression arm for compression of the compression discs.

2. The portable information handling system of claim 1 wherein the controller magnetizes the electropermanent magnet to select the first setting that increases friction relative to the second setting.

3. The portable information handling system of claim 1 wherein the controller magnetizes the electropermanent magnet to select the first setting that decreases friction relative to the second setting.

4. The portable information handling system of claim 1 wherein the predetermined condition comprises a closed position of the first and second housing portions, the controller selecting an electropermanent magnet setting having a greater friction in response to detection of the closed position.

5. The portable information handling system of claim 4 wherein the predetermined condition further comprises end user touch at one or more of the first and second housing portions in the closed position, the controller selecting an electropermanent magnet setting having a reduced friction in response to the end user touch.

6. The portable information handling system of claim 1 wherein the predetermined condition comprises an open position of the first and second housing portions and a release of a touch by the end user at one or more of the first and second housing portions, the controller selecting an electropermanent magnet setting having a greater friction in response to the release of the touch.

7. The portable information handling system of claim 1 wherein the compression discs further comprise:
   a first set of compression discs keyed to the axle; and
   a second set of compression discs keyed to compression arm.

8. The portable information handling system of claim 1 further comprising:
   a capacitive sensor integrated with at least one of the housing portions and operable to detect touch and interfaced with the controller;
   wherein the predetermined condition comprises a touch indicative of end user rotational movement of the housing portions.

9. A method for managing portable information handling system housing portion rotational orientation, the method comprising:
   rotating a first housing portion relative to a second housing portion about a hinge having first and second torque settings;
   toggling an electropermanent magnet in response to a first set of predetermined conditions to select the first torque setting with a first magnetic field; and toggling the electropermanent magnet in response to a second set of predetermined conditions to select the second torque setting with a second magnetic field;

wherein the first torque setting resists rotation about the hinge with a first torque, the second torque setting resists rotation about the hinge with a second torque, and the first torque is greater than the second torque;

wherein toggling the electropermanent magnet to select the first torque setting further comprises:

applying a temporary current to the electropermanent magnet to alter the second magnetic field to the first magnetic field; and attracting with the first magnetic field a ferromagnetic object towards the electropermanent magnet, the ferromagnetic object interfaced with compression discs that create friction in response to rotation of the hinge.

10. The method of claim 9 wherein the attracting with the first magnetic field a ferromagnetic object further comprises:

pulling one end of a lever to the electropermanent magnet;

pivoting the lever about a pivot point to move an opposing end of the lever in an opposite direction; and translating the movement of the opposing end of the lever to compress the compression discs.

11. The method of claim 10 wherein the translating the movement further comprises:

applying the movement of the opposing end of the lever to an end of a compression arm; and pivoting the compression arm about a pivot to move an opposing end of the compression arm against the compression discs.

12. The method of claim 11 further comprising:

keying a first set of the compression discs to an axle of the hinge; and keying a second set of the compression discs to the compression arm, the axle rotating relative to the compression arm.

13. The method of claim 9 wherein the second set of predetermined conditions comprises a predetermined touch detected at a predetermined location of the first housing portion.

14. The method of claim 13 wherein the first set of predetermined conditions comprises a release of the predetermined touch.

15. The method of claim 14 wherein the first set of predetermined conditions further comprises predetermined accelerations detected at the second housing portion.

16. A hinge comprising:

a bracket;

an axle rotationally coupled to the bracket;

a friction device configured to apply friction that resists rotation of the axle at the bracket, the friction device having plural compression discs; and a friction adjuster interfaced with the friction device, the friction adjuster alternating between a first and second friction setting in response to an electronic signal pulse, the first friction setting generating a first friction different from a second friction generated with the second friction setting by varying an amount of compression applied to the compression discs by a compression arm interfaced with the compression disc.

17. The hinge of claim 16 further comprising:

a controller interfaced with the friction adjuster and sending the electronic signal pulse in response to predetermined conditions; and wherein the friction adjuster comprises an electropermanent magnet that changes a magnetic field direction with each electronic signal pulse to adjust the friction device by moving the compression arm.

18. The hinge of claim 17 wherein the predetermined conditions comprise an end user touch at a predetermined location of an information handling system housing rotationally coupled by the hinge.

* * * * *